(12) United States Patent
Karr et al.

(10) Patent No.: US 8,997,065 B2
(45) Date of Patent: Mar. 31, 2015

(54) AUTOMATIC MODULARIZATION OF SOURCE CODE

(71) Applicant: The MathWorks, Inc., Natick, MA (US)

(72) Inventors: Michael E. Karr, Brookline, MA (US); Gael Mulat, La Rochette (FR)

(73) Assignee: The MathWorks, Inc., Natick, MA (US)

( * ) Notice: Subject to any disclaimer, the term of this patent is extended or adjusted under 35 U.S.C. 154(b) by 172 days.

(21) Appl. No.: 13/692,155

(22) Filed: Dec. 3, 2012

(65) Prior Publication Data

US 2013/0145347 A1    Jun. 6, 2013

Related U.S. Application Data

(60) Provisional application No. 61/567,243, filed on Dec. 6, 2011.

(51) Int. Cl.
| | |
|---|---|
| G06F 9/44 | (2006.01) |
| G06F 9/45 | (2006.01) |
| G06F 15/00 | (2006.01) |
| H03M 13/03 | (2006.01) |
| G06F 11/36 | (2006.01) |

(52) U.S. Cl.
CPC .............. *G06F 8/75* (2013.01); *G06F 11/3604* (2013.01); *G06F 11/3608* (2013.01)
USPC ........... 717/133; 712/220; 714/794; 717/124; 717/125; 717/130; 717/131; 717/132; 717/140; 717/155; 717/157

(58) Field of Classification Search
CPC .............. G06F 11/366; G06F 11/3604; G06F 11/3612; G06F 11/3624; G06F 11/3676; G06F 11/3684; G06F 11/3696; G06F 8/433; G06F 8/443; G06F 8/4441; G06F 11/3688
See application file for complete search history.

(56) References Cited

U.S. PATENT DOCUMENTS

| | | | | |
|---|---|---|---|---|
| 5,966,534 | A | * | 10/1999 | Cooke et al. .................. 717/155 |
| 7,543,284 | B2 | * | 6/2009 | Bolton et al. ................. 717/157 |
| 7,886,272 | B1 | * | 2/2011 | Episkopos et al. ............ 717/124 |

(Continued)

OTHER PUBLICATIONS

Notification of Transmittal of the International Search Report and the Written Opinion of the International Searching Authority, or the Declaration corresponding to PCT/US2012/067729, mailed May 2, 2013, 13 pages.

(Continued)

*Primary Examiner* — Don Wong
*Assistant Examiner* — Anibal Rivera
(74) *Attorney, Agent, or Firm* — Harrity & Harrity, LLP

(57) ABSTRACT

A device creates a graph based on source code, and analyzes the source code to identify private variables and functions of the source code and public variables and functions of the source code. The device determines, based on the graph, a size threshold and semantics-related characteristics of functions and variables for each module, of multiple modules, and assigns, based on the graph, the private variables and functions to a corresponding module of the multiple modules. The device reduces, based on the graph, a number of the public variables and functions assigned to each module, and generates the multiple modules based on one or more of the graph, the size threshold, the assigned private variables and functions, and the number of the public variables and functions assigned to each module.

24 Claims, 14 Drawing Sheets

(56) References Cited

U.S. PATENT DOCUMENTS

| | | | |
|---|---|---|---|
| 7,996,825 B2* | 8/2011 | Chakrabarti et al. | 717/140 |
| 8,621,441 B2* | 12/2013 | Landwehr et al. | 717/131 |
| 2005/0097528 A1* | 5/2005 | Chakrabarti et al. | 717/140 |
| 2005/0172209 A1* | 8/2005 | Cameron et al. | 714/794 |
| 2008/0250231 A1* | 10/2008 | Tagawa et al. | 712/220 |
| 2008/0307398 A1* | 12/2008 | Gellerich | 717/132 |
| 2010/0251221 A1 | 9/2010 | Nori et al. | |
| 2010/0275186 A1* | 10/2010 | McGarvey et al. | 717/132 |
| 2011/0321013 A1* | 12/2011 | Raunstien | 717/125 |
| 2012/0151453 A1* | 6/2012 | Finking et al. | 717/130 |
| 2012/0167060 A1* | 6/2012 | Landwehr et al. | 717/132 |

OTHER PUBLICATIONS

Emanuelsson, P., et al.: "A Comparative Study of Industrial Static Analysis Tools," Electronic Notes in Theoretical Computer Science, Elsevier, Amsterdam, NL, vol. 217, Jul. 21, 2008, pp. 5-21.

Mitchell, B. S., et al.: "On the Automatic Modularization of Software Systems Using the Bunch Tool," IEEE Transactions on Software Engineering IEEE USA, vol. 32, No. 3, Mar. 2006, pp. 193-208.

* cited by examiner

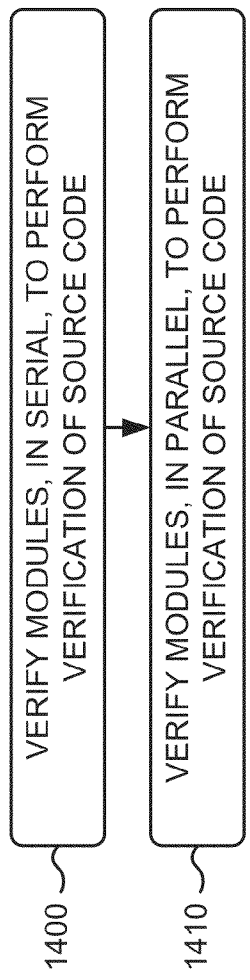

AUTOMATIC MODULARIZATION OF SOURCE CODE

RELATED APPLICATION

This application claims priority under 35 U.S.C. §119 based on U.S. Provisional Patent Application No. 61/567,243, filed Dec. 6, 2011, the disclosure of which is incorporated by reference herein in its entirety.

BRIEF DESCRIPTION OF THE DRAWINGS

The accompanying drawings, which are incorporated in and constitute a part of this specification, illustrate one or more implementations and, together with the description, explain these implementations. In the drawings:

FIGS. 11-14 are flow charts of an example process for automatically modularizing source code according to an implementation described herein.

DETAILED DESCRIPTION

Figure 1:
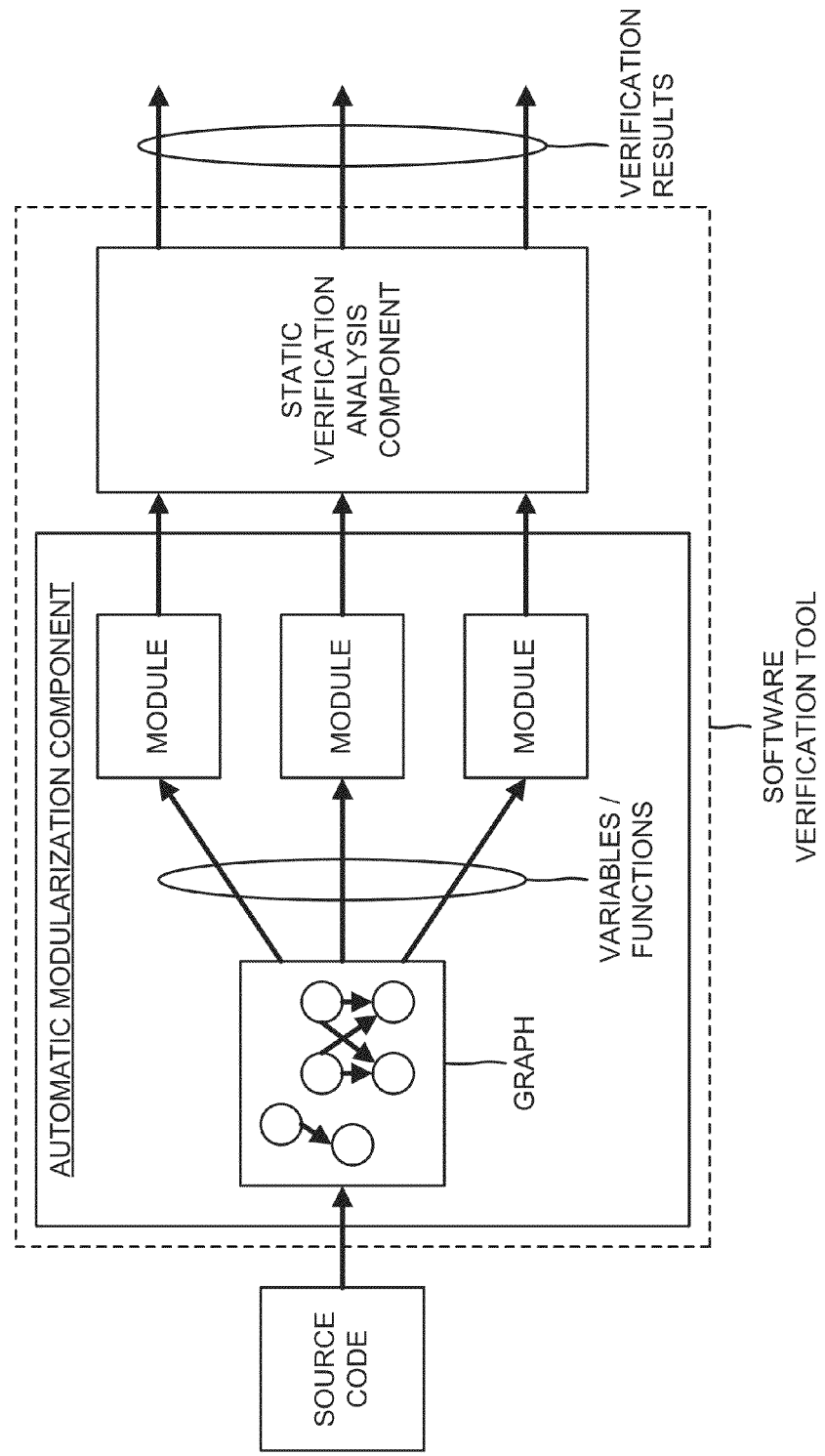
FIG. 1 is a diagram of an overview of an example implementation described herein.

The following detailed description refers to the accompanying drawings. The same reference numbers in different drawings may identify the same or similar elements.

Software products can potentially be very large and complex. Software testing is the process used to measure the quality of developed computer software. Quality may be judged based on a number of metrics, such as correctness, completeness, reliability, number of bugs found, efficiency, and compatibility.

The amount of testing required for a particular software project frequently depends on the end use for the deployed software. A developer of game software intended for personal computers, for example, may devote relatively few resources into formal testing of the software. In contrast, the developer of a mission critical application in the healthcare, automotive, or utility industries may require a much more rigorous level of software testing.

One technique for testing software is based on the concept of static verification of the software code. In general, static code verification is an analysis performed without executing the software. Static verification of software code can prove, for example, which operations are free of run-time errors, such as numeric overflows, divisions by zero, buffer overflows, or pointer issues, and identify where run-time errors will or might occur.

In one example system, static verification is used to classify the code into categories. The categories may include code determined to be good, safe, or correct; code determined to have errors; code determined not to be accessible (e.g., dead code or deactivated code); and code for which an error may be present but for which the error could not be conclusively determined ("possible error" code). Code classified as a "possible error" represents code that the static verification system could not conclusively determine as including an error. A developer faced with a "possible error" code may be required to manually review the code to determine whether the code will actually cause an error and, if so, to determine what section of the code is the underlying cause of the error.

Static verification tools struggle with two contradictory problems. If the static verification tool analyzes the entire source code, the static verification tool may take a long time to perform the verification. However, if the static verification tool analyzes the source code part by part, the verification gives less accurate results on each part because of the lack of knowledge of the interactions with the parts of source code that are not provided.

Current attempts to verify large software code have been unsuccessful. For example, particular software code may be evaluated in ten minutes or less, which may be acceptable. However, other software code, larger with respect to the particular software code, may be evaluated in two hours, which may be unacceptable. In one example, one method includes analyzing the large software code at one time, but providing options to enable selection of cheaper algorithms (e.g., computationally cheaper algorithms). Such a method requires an undesirably long verification time and/or provides uninteresting results (e.g., too many potential alarms that require review by the user). Another method includes analyzing the code file by file, and permitting filtering of problems due to unknown inputs. The user may provide some information about the inputs in order to reduce the number of problems due to the inputs. This approach may be very difficult for the user since the user needs to know all of the constraints that are implicitly verified by variables when they are accessed by different files. Alternatively, the user may look at problems that are completely local to a file, without any impact from the inputs of the file. However, such problems represent an average of only a small percentage of the problems in the file.

Overview

Systems and/or methods described herein may provide a software verification tool that enables automatic modularization of software code (e.g., source code). The software verification tool may enable software code, such as large sized source code, to be split into one or more modules (e.g., portions of the software code). In one example, the modularization of the software code may or may not be visible by the user.

FIG. 1 is a diagram of an overview of an example implementation described herein. As shown, a software verification tool may include an automatic modularization component and a static verification analysis component. The automatic modularization component may receive source code, and may generate a graph based on the source code. In one example, the automatic modularization component may generate a graph of representations (e.g., nodes) of variables and functions of the source code and representations (e.g., arcs connecting nodes) of dependencies between the variables and/or functions. The automatic modularization component may analyze the source code in order to identify private and public variables and private and public functions.

The automatic modularization component may define a maximum size threshold for each module (e.g., a number of lines of code, a number of functions in a module, a number of variables in a module, etc.) based on the graph, and may minimize the number of public variables and functions provided in each module based on the graph. In one example, public variables and/or functions may be used outside of each module, whereas private variables and/or functions may only be used inside each module. The automatic modularization component may provide the identified private variables and/or functions in each module based on the graph. The automatic modularization component may generate the modules as either a set of files or a set of variables and/or functions based on the graph, the maximum size threshold, the private variables and/or functions in each module, and/or the minimization of the number of public variables and functions provided in each module.

As further shown in FIG. 1, the automatic modularization component may provide the modules to the static verification analysis component, and the static verification analysis component may receive the modules. The static verification analysis component may perform a verification of the modules, in serial (e.g., one at a time) or in parallel (e.g., which may reduce the time required for verification), and may generate results based on the verification of the modules. In one example, a graphical user interface provided by the software verification tool may help to efficiently review the verification results. Each module may be accurately verified by the software verification tool because each module may include very few public variables and/or functions, and may be aware of information contained in other modules.

The term "source code," as used herein, is to be broadly construed to include program instructions of a programming language (e.g., a C programming language, a C++ programming language, a Pascal programming language, etc.) that may be provided in a predetermined format and/or style, and/or may include source code that uses fixed-point and/or floating-point real number representations.

The term "module," as used herein, is to be broadly construed to include a portion of software code, such as source code.

Example Environment Arrangement

Figure 2:
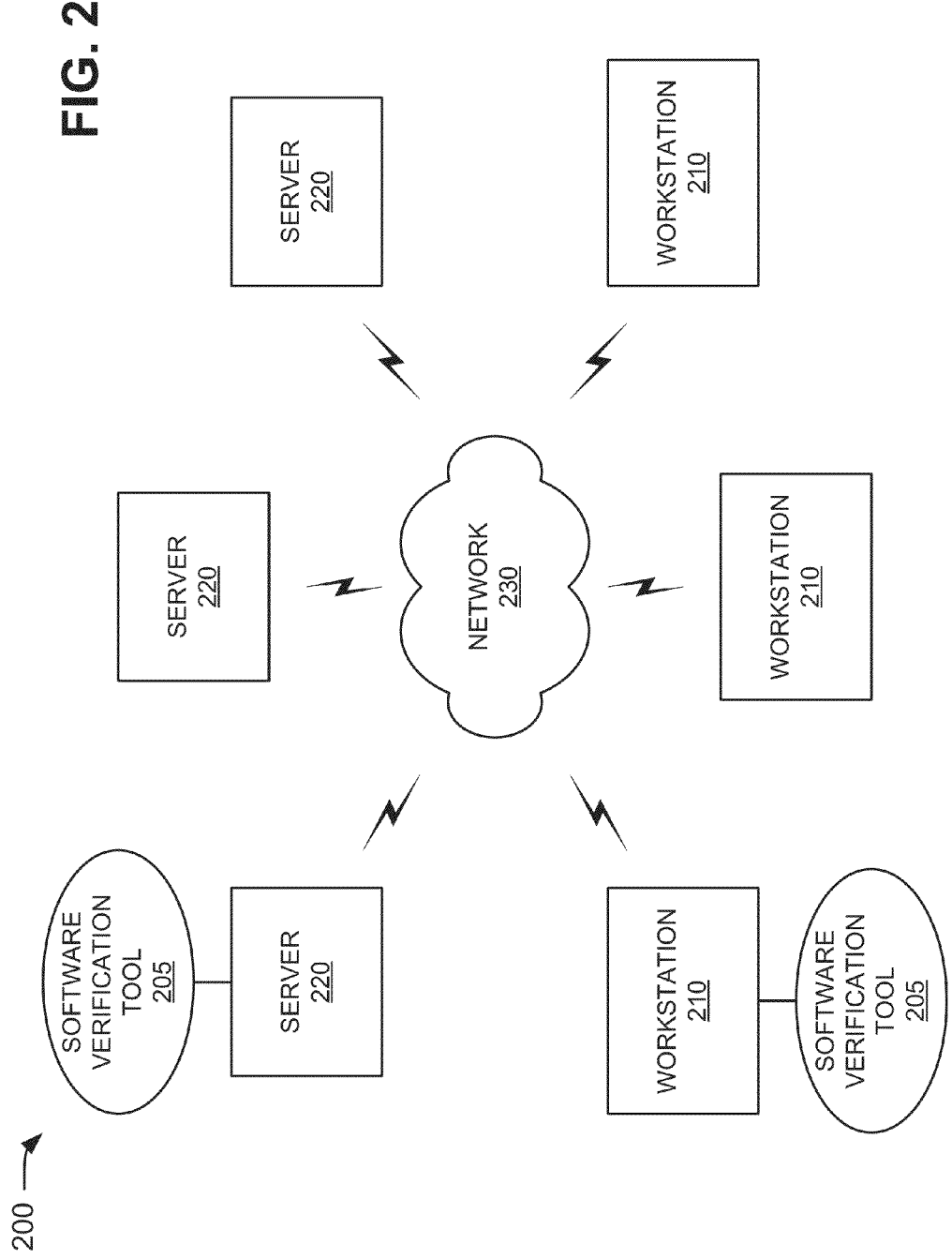
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more workstations 210 and one or more servers 220 connected by a network 230. A software verification tool 205 may be executed by one or more of workstations 210 and/or servers 220 to assist in software verification. Components of environment 200 may connect via wired and/or wireless connections. Two software verification tools 205, three workstations 210, three servers 220, and one network 230 have been illustrated in FIG. 2 for simplicity.

Software verification tool 205 may assist software developers (e.g., users) in verifying developed software code. In one example implementation, as shown in FIG. 2, software verification tool 205 may include client-side components and server-side components. The client-side components may be executed at one or more of workstations 210 while the server-side components may execute at one or more of servers 220.

Alternatively, or additionally, depending on the size of the source code to be verified, software verification tool 205 may execute exclusively at workstation 210. In one example, software verification tool 205 may verify software that is being designed, on workstation 210, for a target machine. The target machine may be a device, such as a cellular phone, a medical device, or another device that is to execute the software being developed by a developer. In these situations, software verification tool 205 may include options so that, when verifying the software for the target machine, software verification tool 205 can simulate the environment of the target machine. For example, for an embedded system that uses a 16-bit processor, the value of certain variables, such as an integer, may be verified as a 16-bit value, even though the workstation 210 at which the software is being developed may use a 32-bit or a 64-bit processor.

Workstations 210 may generally include any computing device at which software may be developed, such as desktop computers, laptop computers, tablet computers, smart phones, etc., that may be used for general computing tasks. In one example implementation, workstations 210 may execute a technical computing environment (TCE) that presents a user with an interface that enables efficient analysis and generation of technical applications. For example, the TCE may provide a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, the TCE may include a dynamically-typed programming language (e.g., the M language or MATLAB® language) that can be used to express problems and/or solutions in mathematical notations. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

Servers 220 may each include a device, such as a computer or another type of computation and communication device. Server 220 may generally provide services to other devices (e.g., workstations 210) connected to network 230. In one example, one or more of servers 220 may include server components of software verification tool 205.

Network 230 may include any type of network, such as a local area network (LAN), a wide area network (WAN), a telephone network (e.g., the Public Switched Telephone Network (PSTN) or a cellular network), an intranet, the Internet, or a combination of networks.

Although FIG. 2 shows example components of environment 200, in other implementations, environment 200 may contain fewer components, different components, differently arranged components, and/or additional components than those depicted in FIG. 2. Alternatively, or additionally, one or more components of environment 200 may perform one or more tasks described as being performed by one or more other components of environment 200.

Example Device Architecture

Figure 3:
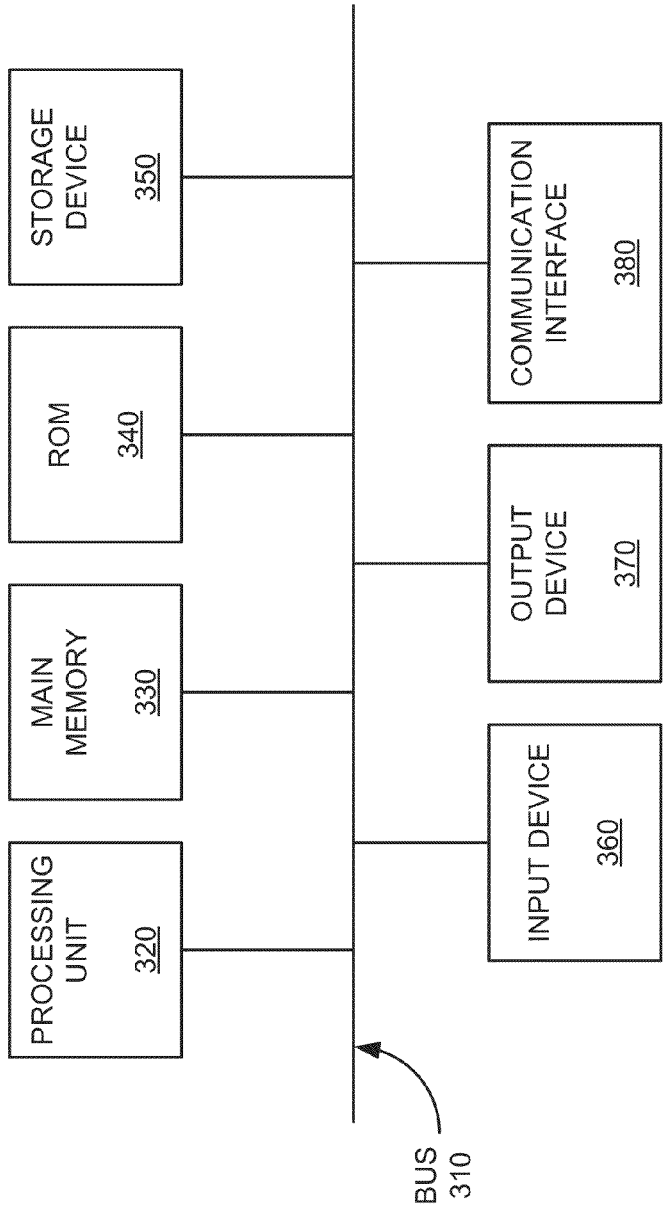
FIG. 3 is a diagram of example components of one or more of the devices of the environment depicted in FIG. 2.

FIG. 3 is an example diagram of a device 300 that may correspond to one or more of the devices of environment 200.

As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a mouse, a pen, a microphone, voice recognition and/or biometric mechanisms, a remote control, a touch screen, etc. Output device 370 may include a mechanism that outputs information from device 300, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Software Verification Tool Architecture

As previously mentioned, software verification tool 205 may be used to measure the quality of developed computer software and assist users in locating errors ("bugs") in the computer software.

In one implementation, software verification tool 205 may be used in the context of a technical computing environment (TCE), described above. Software verification tool 205 may operate as a component in a TCE to verify code created with the TCE. For example, the TCE may give the user an option, such as through a graphical interface, to create models. The TCE may then compile the created models for execution on a target system. Software verification tool 205 may be used to verify the code that embodies the models.

Alternatively, or additionally, software verification tool 205 may be used with substantially any software development project and/or in any type of computing environment. For example, software verification tool 205 may, but is not limited to, analyze code written in a conventional programming language, such as C++, C, and Ada, and which is produced manually by a developer with no use of a TCE. In addition, software verification tool 205 can be used in standalone environments, distributed environments, heterogeneous computing environments, homogeneous computing environments, etc.

Figure 4:
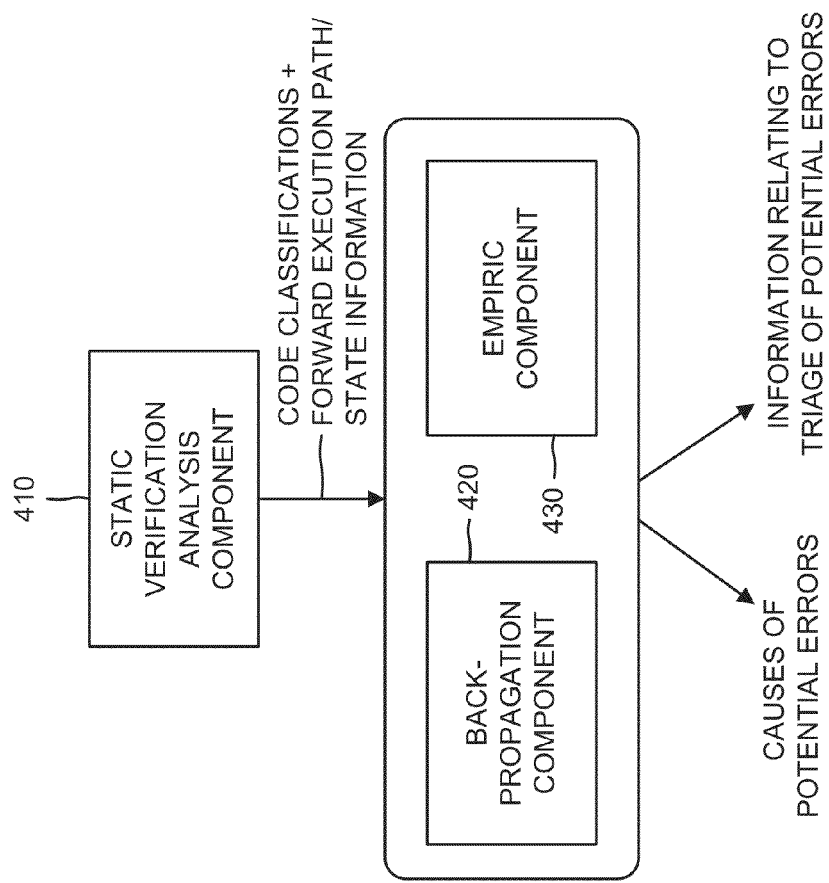
FIG. 4 is a diagram of example functional components of a software verification tool depicted in FIG. 2.

FIG. 4 is a diagram of example functional components of software verification tool 205. In one implementation, the functions described in connection with FIG. 4 may be performed by one or more components of device 300 (FIG. 3) and/or by one or more devices 300. As shown in FIG. 4, software verification tool 205 may include a static verification analysis component 410, a back-propagation component 420, and an empiric component 430.

Static verification analysis component 410 may perform a static verification analysis of input software code (e.g., source code). The static verification may be performed using abstract interpretation. Static verification techniques may be based on automatically determining properties of some or all possible execution paths, of the input software code, in some or all possible execution environments. During static verification, static verification analysis component 410 may keep track of a number of states, where each state may be defined by an execution point in the software code and by a set of variable values. In this manner, for a given section of software code, static verification analysis component 410 may keep track of a number of possible execution paths, where each execution path may be defined by a linked graph of nodes, and where each node may represent a state.

In practice, if the execution path for every possible state were considered, the number of possible execution paths and nodes may quickly become computationally infeasible, as the variables in the software code can each individually have many different values (e.g., an eight bit character variable may have 256 possible different values). Static verification analysis component 410 may use abstract interpretation to limit the number of execution paths to a computationally manageable set. Abstract interpretation may refer to the approximation of mathematical structures, such as the variables in the software code, by representing the variable states abstractly. Static verification component 410 may use a number of different abstract interpretation techniques. For example, variables in the software code may be approximated using lattices or abstract domains, based on the sign of variables, intervals assigned to the variables, linear equalities, difference-bound matrices, etc.

In performing the static verification, static verification analysis component 410 may perform an over-approximation of the possible states. Over-approximation may refer to an abstract approximation of states in the execution path in which the states are approximated such that all states that may occur during a real execution of the software code are included. The over-approximated states may additionally include states that may never actually occur during execution of the software code. Over-approximation may be useful when testing soundness of software code.

Static verification analysis component 410 may determine whether operations in the code are associated with an error. For example, static verification analysis component 410 may perform an analysis, using execution paths calculated through over-approximation of the abstract values, to determine which operations (i.e., code points) are free of run-time errors or contain possible errors. Errors that may be found include, for example: overflows and underflows; divisions by zero and other arithmetic errors; out-of-bounds array access; illegally de-referenced pointers; read access to non-initialized data; dangerous data type (e.g., floating point, integer, etc.) conversions; dead code; access to null pointers; dynamic errors related to object programming and inheritance; errors related to exception handling; non-initialized class members in C++ language; and/or impossible entry point synchronization errors. Impossible entry point synchronization may refer to errors in the synchronization of two concurrent tasks.

As a result of the static analysis, static verification analysis component 410 may classify the code into classifications that relate to possible errors in the code. In one example implementation, the classification may include classifying each possible failure point in the source code into classes that define, for example: code that has no errors, code that may possibly include errors (unknown or unproven conditions), code that definitely has errors, or code that cannot be reached. The classifications may be presented to the user in a number of possible ways, such as by changing the appearance of the code (e.g., font type, font size, font color, highlighting, etc.) based on its classification. In one example implementation, the code may be presented using a color coding scheme. For example, the code may be shown on a display in a GREEN color (code that has no errors), a RED color (code that definitely has errors in all possible dynamic execution paths), a GREY color (code that cannot be reached), or an ORANGE color (unknown or unproven error conditions and/or a mix of situations that include GREEN code in some situations and RED code in others).

Static verification analysis component 410 may also return the execution path/state information for the static verification. For example, static verification analysis component 410 may store the state graphs associated with each of the determined execution paths.

Back-propagation component 420 may traverse the execution paths determined by static verification analysis component 410, in a backwards direction (i.e., back-propagation) to determine causes of errors or possible errors found in the software code by static verification component 410 (i.e., during the forward propagation through the execution paths, as performed by static verification analysis component 410). Back-propagation component 420 may perform the back-propagation beginning from states that correspond to errors or potential errors (e.g., ORANGE code). The determined causes of the potential errors may be output to on a display and/or saved.

Empiric component 430 may provide additional information relating to the potential errors. The additional information may be used to assist in the classification of the potential errors. Empiric component 430 may generally operate on semantic information obtained from the software code.

The potential error causes, when output, may be associated with an error category to assist the developer in understanding the error and determining whether the error needs to be fixed. For example, error causes may be categorized as: (1) "contextual," which may mean that the cause is inside of an analyzed section of code; (2) "robustness," which may mean that the cause is due to an input for the analyzed code (i.e., the cause comes from outside of the analyzed code); and (3) "robustness with data range specifications," which may mean that the cause is an input that has been defined, by the developer, to a range.

The categories assigned to the potential causes may be used by a developer in deciding which potential errors should be further investigated and/or how to prioritize the investigation of the potential errors. This information may thus be used by the developer in handling the "triage" of the potential errors.

Although FIG. 4 shows example of functional components of software verification tool 205, in other implementations, software verification tool 205 may contain fewer functional components, different functional components, differently arranged functional components, and/or additional functional components than those depicted in FIG. 4. Alternatively, or additionally, one or more functional components of software verification tool 205 may perform one or more other tasks described as being performed by one or more other functional components of software verification tool 205.

Figure 5:
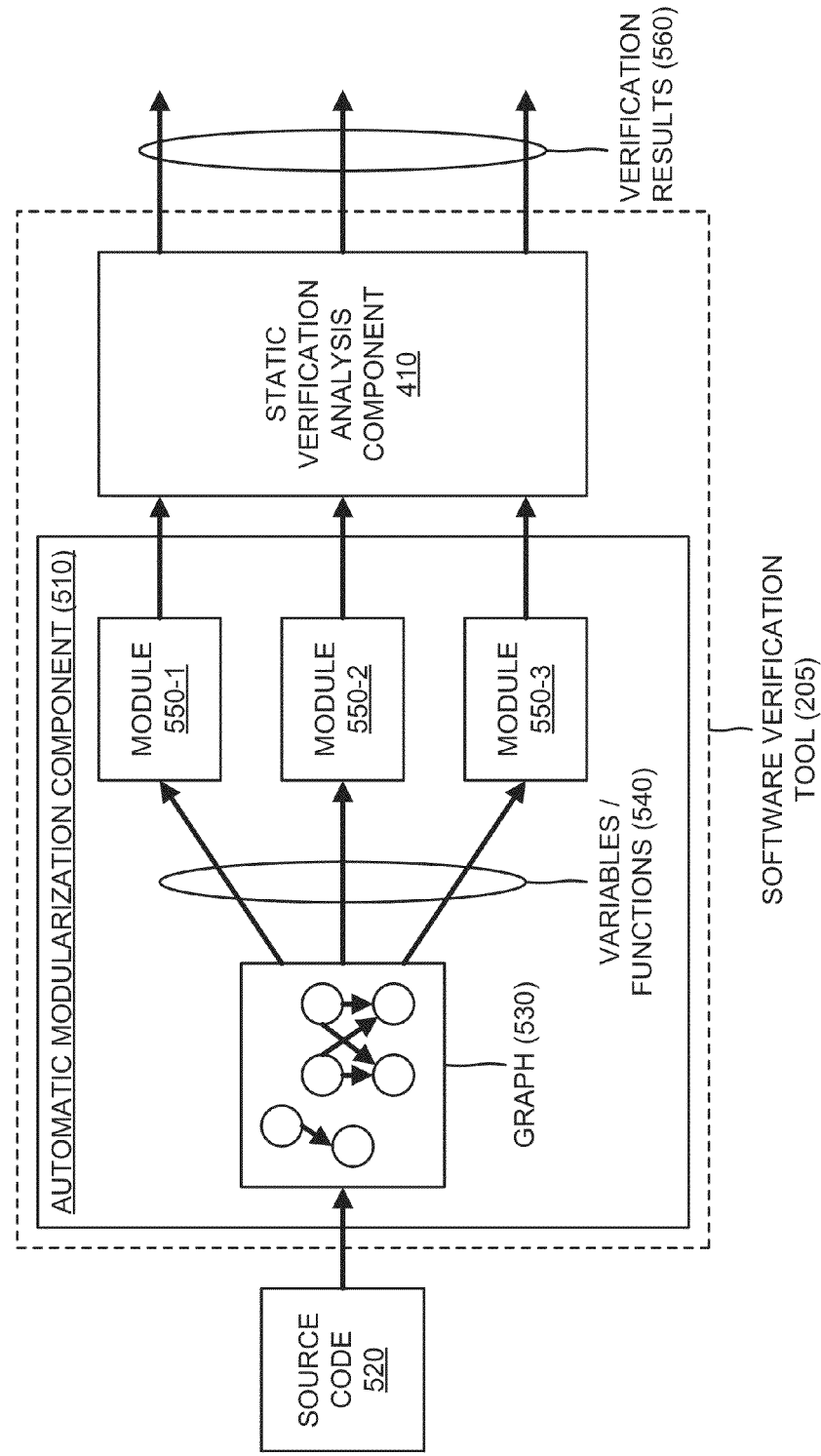
FIG. 5 is a diagram of further example functional components of the software verification tool.

FIG. 5 is a diagram of further example functional components 500 of software verification tool 205. In one implementation, the functions described in connection with FIG. 5 may be performed by one or more components of device 300 (FIG. 3) and/or by one or more devices 300. As shown in FIG. 5, software verification tool 205 may include static verification analysis component 410 and an automatic modularization component 510. Static verification analysis component 410 may include the features described above in connection with, for example, FIG. 4.

Automatic modularization component 510 may receive source code 520, and may generate a graph 530 based on source code 520. In one example, automatic modularization component 510 may generate a graph 530 of representations (e.g., nodes) of variables and functions of source code 520 and representations (e.g., arcs connecting nodes) of dependencies between the variables and/or functions. Automatic modularization component 510 may analyze source code 520 in order to identify private and public variables (e.g., reads and writes) and private and public functions provided in source code 520.

Based on graph 530, automatic modularization component 510 may define a maximum size threshold for each module 550-1 through 550-3 (collectively referred to herein as "modules 550," and, in some instances, singularly as "module 550") to be generated by automatic modularization component 510. In one example, the maximum size threshold may include a number of lines of source code 520, a number of functions in module 550, a number of variables in module 550, etc. Automatic modularization component 510 may minimize the number of public variables and functions provided in each module 550 based on graph 530. In one example, public variables and/or functions may be used outside of each module 550, whereas private variables and/or functions may only be used inside each module 550.

Automatic modularization component 510 may provide the identified private variables/functions and/or public variables/functions (if any) in each module 550 based on graph 530, as indicated by reference number 540. Automatic modularization component 510 may generate modules 550 as either a set of files or a set of variables and/or functions based on graph 530, the maximum size threshold, the private and/or public variables/functions in each module 550, the minimization of the number of public variables and functions provided in each module 550, and/or semantics-related characteristics of functions and variables.

As further shown in FIG. 5, automatic modularization component 510 may provide modules 550 to static verification analysis component 410, and static verification analysis component 410 may receive modules 550. Static verification analysis component 410 may perform a verification of modules 550, in serial (e.g., one at a time) or in parallel (e.g., which may reduce the time required for verification), and may generate results 560 based on the verification of modules 550. In one example, a graphical user interface provided by software verification tool 205 may help to efficiently review verification results 560. Each module 550 may be accurately verified by software verification tool 205 because each module 550 may include very few public variables and/or functions, and may be aware of information contained in other modules 550.

Although FIG. 5 shows example of functional components of software verification tool 205, in other implementations, software verification tool 205 may contain fewer functional components, different functional components, differently arranged functional components, and/or additional functional components than those depicted in FIG. 5. Alternatively, or additionally, one or more functional components of software verification tool 205 may perform one or more other tasks described as being performed by one or more other functional components of software verification tool 205.

Example Automatic Modularization of Source Code

Static analysis and verification tools can encounter scaling difficulties when applied to large bodies of programming code. To address this, software verification tool 205 may provide a mechanism (e.g., automatic modularization component 510) that automatically splits large source code into modules. Automatic modularization component 510 may be included in a code verification component, a bug finding component, or a static analysis component of software verification tool 205. The code verification component may help a user prove that source code contains no runtime bugs, and help the user start by fixing the portions of the source code that contain bugs. The bug finding component may attempt to statically locate bugs in the source code, without being exhaustive. The static analysis component may include a TCE-based design verifier and/or other similar products. Alternatively, automatic modularization component 510 may be separate and distinct from other components of software verification tool 205.

In one example implementation, if automatic modularization component 510 provides an acceptable split of source code into modules, automatic modularization component 510 may not need to generate an acceptable summary of the modules. However, if automatic modularization component 510 provides an unacceptable split of the source code into modules, automatic modularization component 510 may need to generate an acceptable summary of the modules. Automatic modularization component 510 may determine a correct balance between an acceptable split of the source code and an acceptable summary of the modules.

Alternatively, or additionally, automatic modularization component 510 may provide an intelligent definition of the modules, otherwise results of verification of the source code may be poor. For example, if the modules are poorly defined and software verification tool 205 is locating bugs in the source code, software verification tool 205 may miss a lot of bugs or may provide false positives (e.g., locate bugs that actually do not occur). If the modules are poorly defined and software verification tool 205 is proving the absence of bugs in the source code, software verification tool 205 may provide a lot of false alarms. Furthermore, if the modules are too large, software verification tool 205 may take an inordinate amount of time to verify the source code.

Automatic modularization component 510 may provide a formal computation of interactions between functions and variables of source code 520. Automatic modularization component 510 may compute an optimal split of source code 520 into modules 550 that adheres to a particular threshold size, but minimizes the relationships with other modules 550. Verification of a particular module 550 by software verification tool 205 may experience a few problems due to unknown inputs of the particular module. However, the verification may have an improved analysis time since the particular module 550 may be sized to fit well with the complexity of software verification tool 205. The verification of the particular module 550 may experience few overall problems since software verification tool 205 may use complex mechanisms and since the size of the particular module 550 is less than a threshold.

Automatic modularization component 510 may automatically and statically evaluate relationships between functions and variables in the complete source code 520. Automatic modularization component 510 may analyze a graph of relationships between functions and variables, in order to incrementally build modules 550 within a particular threshold size, while minimizing relationships between modules 550. Automatic modularization component 510 may be applied to raw source code 520, to proposed modules 550, and may also be applied after an alias analysis of source code 520, in order to take into account reads and writes of global variables via pointers, as well as function calls via function pointers.

An output of module 550 may include a list of public and/or private functions and/or variables of module 550. A variable or function of the source code 520 may appear in none, one, or several such lists. The lists may be provided to software verification tool 205 in order to increase the accuracy of software verification tool 205 when verifying module 550. Private global variables of module 550 may not need to utilize unknown values, so the results of software verification tool 205 may include fewer problems. Public global variables of other modules 550 may be used by a stubber (e.g., to create stubs of unknown functions) of software verification tool 205 in order to guarantee that unknown functions will write in the given global variables. This may ensure a sound verification of module 550 since software verification tool 205 may not miss effective writes done in other modules 550. When modules 550 are built, their verification can be fully parallelized since all needed information may have already been gathered on the entire source code 520. Automatic modularization component 510 may be executed several times in order to create a graph of all proposed module splits. The user may choose a module split based on tips about the number of modules 550, the level of remaining relationships between modules 550, the time it may take for software verification tool 205 to verify all modules 550, etc.

Automatic modularization component 510 may split big models into smaller parts, in order to help with formal verification of the models. Automatic modularization component 510 may allow for incremental verification of software code by locating which module 550 to re-analyze when a piece of code has changed. Automatic modularization component 510 may require very little effort on the part of the user, may execute with reasonable efficiency, may provide control over a degree of modularization (e.g., the user may specify a maximum complexity of a module 550), and may propose modules 550 that minimize relationships between modules 550.

Automatic modularization component 510 may exchange information with software verification tool 205 so that software verification tool 205 may provide accurate verification of each module 550 and may provide good overall precision (e.g., due to knowledge of public/private variables and functions of all modules 550). The complexity of a module 550 may be expressed as a value or number, as described below in connection with FIG. 8. In one example implementation, automatic modularization component 510 may help the user choose the complexity value without the user having to understand the complexity value. Automatic modularization component 510 may propose an optimal complexity, or may propose ways to help the user choose the optimal complexity (e.g., the optimal number of modules 550).

Figure 6:
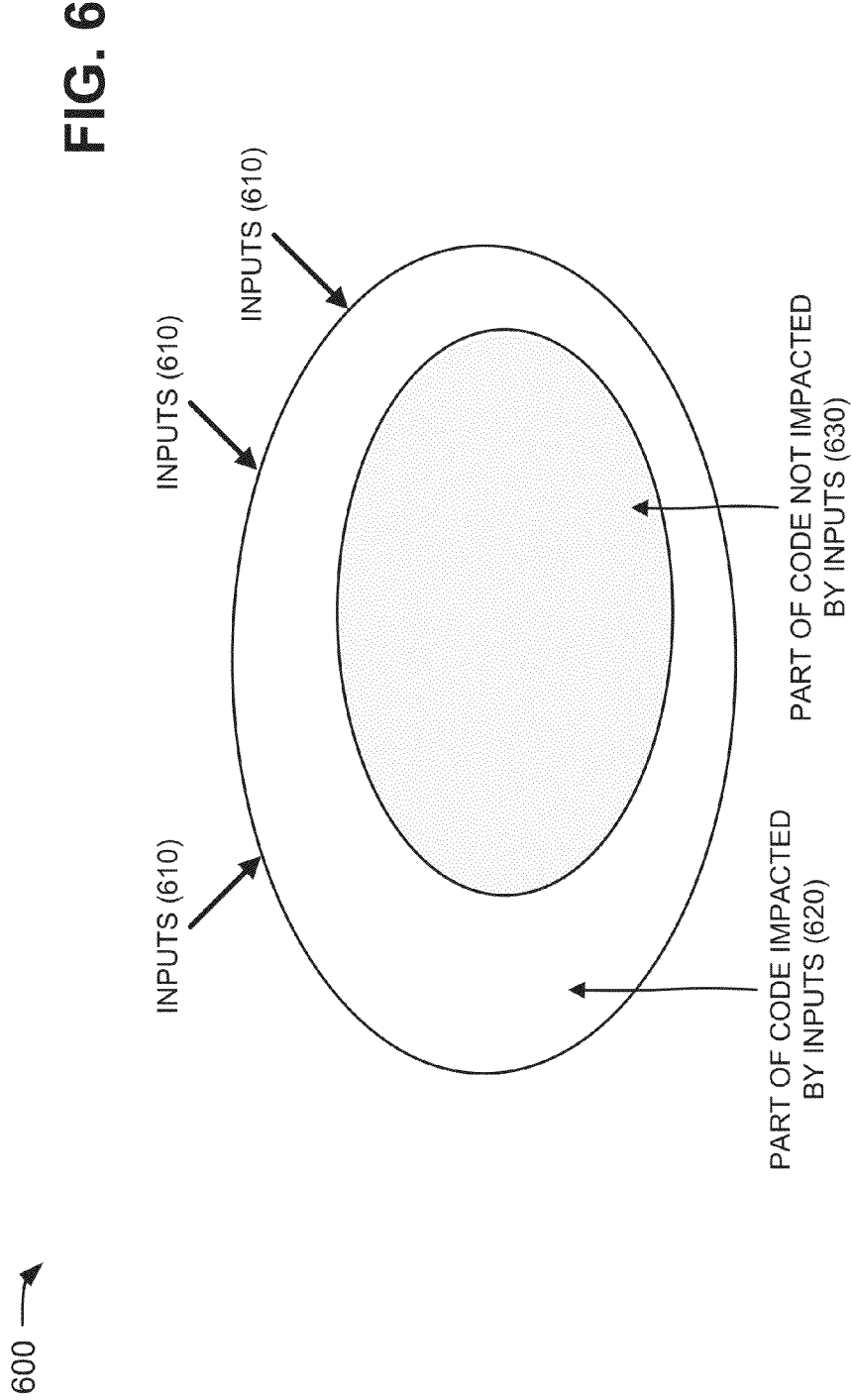
FIG. 6 is a diagram of an example representation of source code to be automatically modularized by the software verification tool.

FIG. 6 is a diagram of an example representation of source code 600 to be automatically modularized by automatic modularization component 510 of software verification tool 205. As shown, source code 600 may include inputs 610, such as, for example, inputs to functions contained in source code 600. A part 620 of source code 600 may be impacted by inputs 610 (e.g., may contain public variables and/or functions). Another part 630 of source code 600 may not be impacted by inputs 610 (e.g., may contain private variables and/or functions). Automatic modularization component 510 may automatically analyze source code 600 to identify private and public variables and functions of source code 600, and may define a smart division of the functions and the variables.

Automatic modularization component 510 may define a maximum size threshold for each module 550, and may provide the identified private variables and functions of source code 600 in each module 550. Automatic modularization component 510 may minimize a number of public variables and functions of source code 600 provided in each module 550, and may output modules 550 as a set of files or a set of variables and functions. For example, automatic modularization component 510 may determine the relations of the public variables and functions with other modules 550, and may select, for a particular module 550, the public variables and functions that have minimal relations (e.g., less than a particular threshold value) with other modules 550. This, in turn, may minimize a number of public variables and functions of source code 600 provided in each module 550.

Software verification tool 205 may perform verification of the modules 550, and may output results of the verification for each of modules 550. For example, if there are five modules 550, software verification tool 205 may output five verification results. Alternatively, or additionally, software verification tool 205 may combine the verification results into a single verification result, and may output the single verification result. Each module 550 may be robust since inputs 610 may be randomized by automatic modularization component 510. The verification results output by software verification tool 205 may be more precise due to few impacts from inputs 610.

Although FIG. 6 shows example information of source code 600, in other implementations, source code 600 may contain less information, different information, and/or additional information than depicted in FIG. 6.

Figure 7:
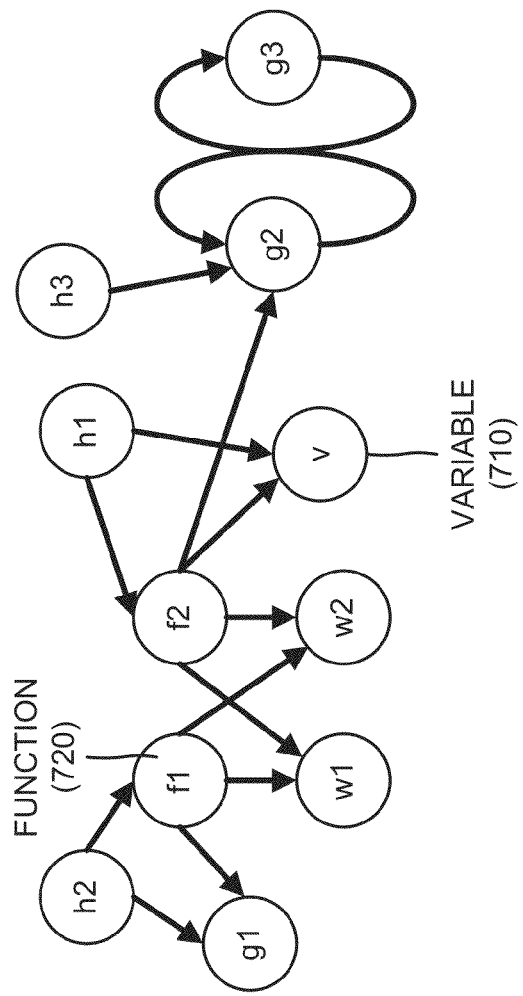
FIG. 7 is a diagram of an example graph that may be generated for source code by the software verification tool.

FIG. 7 is a diagram of an example graph 700 that may be generated for source code 600 (FIG. 6) by automatic modularization component 510. In one example, graph 700 may correspond to graph 530 shown in FIG. 5. As shown, graph 700 may include representations (e.g., nodes) of variables 710 (e.g., w1, w2, and v) and representations (e.g., nodes) of functions 720 (e.g., f1, f2, g1, g2, g3, h1, h2, and h3). Automatic modularization component 510 may determine a maximum complexity for each module 550 based on the representations of variables 710 and the representations of functions 720. Alternatively, or additionally, automatic modularization component 510 may map the representations of variables 710 and the representations of functions 720 to files.

Automatic modularization component 510 may give each variable and/or function, provided in a node, a value that may depend on a complexity or a physical size associated with the variable and/or function. As further shown in FIG. 7, automatic modularization component 510 may provide arcs (e.g., arrows) between the nodes of graph 700. The arcs may represent dependencies between the variables and/or functions represented by the nodes. In one example implementation, automatic modularization component 510 may combine two or more nodes of graph 700 together to create a module 550, and may minimize dependencies between nodes, in one module 550, from nodes in other modules 550.

Although FIG. 7 shows example information of graph 700, in other implementations, graph 700 may contain less information, different information, and/or additional information than depicted in FIG. 7.

Figure 8:
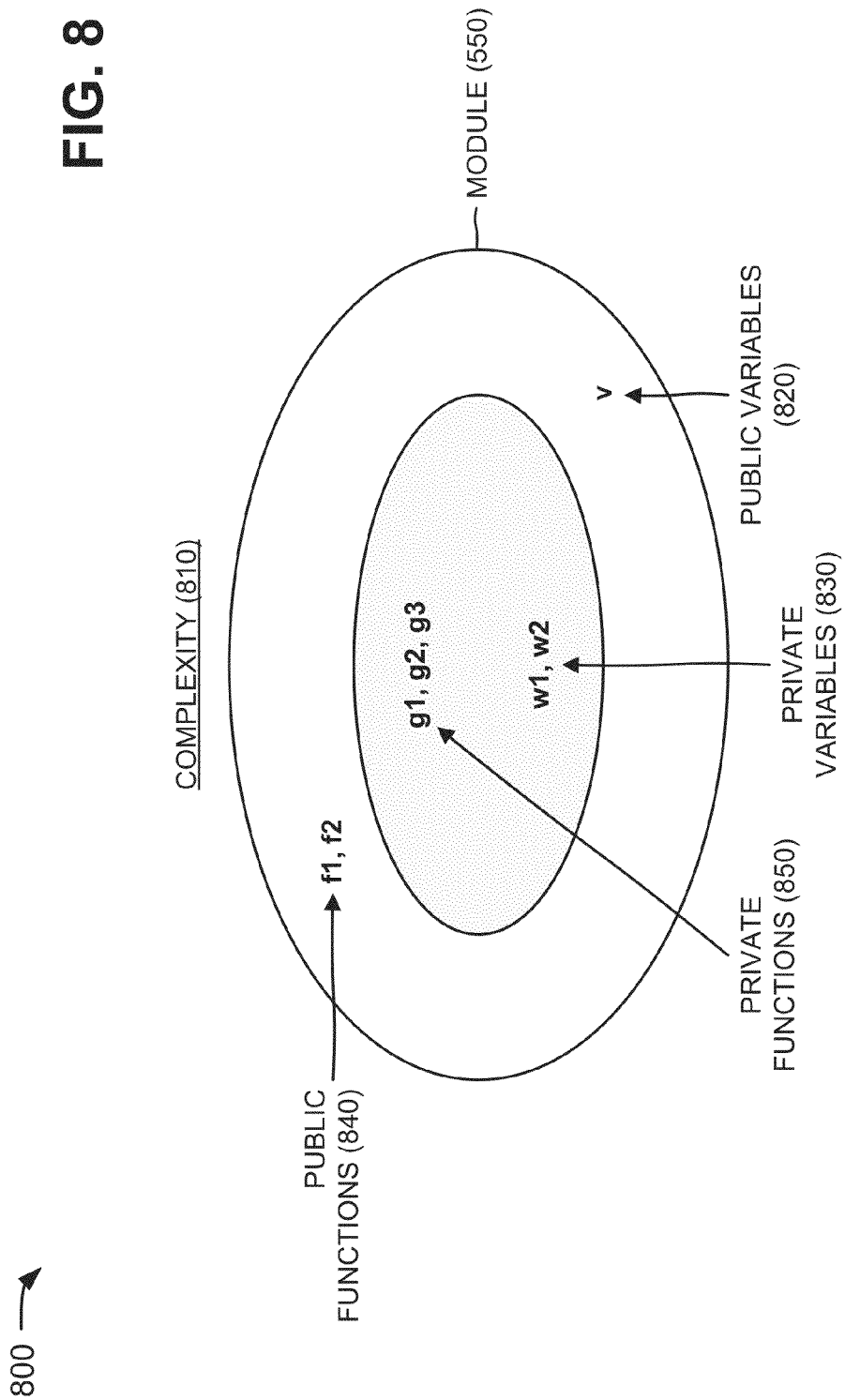
FIG. 8 is a diagram of an example representation of the source code after the automatic modularization by the software verification tool.

FIG. 8 is a diagram of an example representation 800 of source code 600 (FIG. 6) after source code 600 is automatically modularized by software verification tool 205. With reference to FIG. 8, automatic modularization component 510 may create a set of modules 550 for source code 600, where each module 550 may include a complexity 810 (e.g., a number value), public variables 820 (e.g., v), private variables 830 (e.g., w1 and w2), public functions 840 (e.g., f1 and f2), and/or private functions 850 (e.g., g1, g2, and g3).

Complexity 810 may include a value that represents a sum of the values assigned to the nodes (e.g., of graph 700) associated with public variables 820, private variables 830, public functions 840, and private functions 850. For example, if f1 and f2 are each assigned a value of "2," g1, g2, and g3 are each assigned a value of "1," w1 and w2 are each assigned a value of "3," and v is assigned a value of "4," complexity 810 may equal "17" (e.g., 2+2+1+1+1+3+3+4).

Private variables 830 and private functions 850 may be referenced only in the particular module 550 associated with representation 800. Public variables 820 and public functions 840 may be referenced in a different module 550 and/or in the particular module 550 associated with representation 800.

Although FIG. 8 shows example information of representation 800, in other implementations, representation 800 may contain less information, different information, and/or additional information than depicted in FIG. 8.

Figure 9:
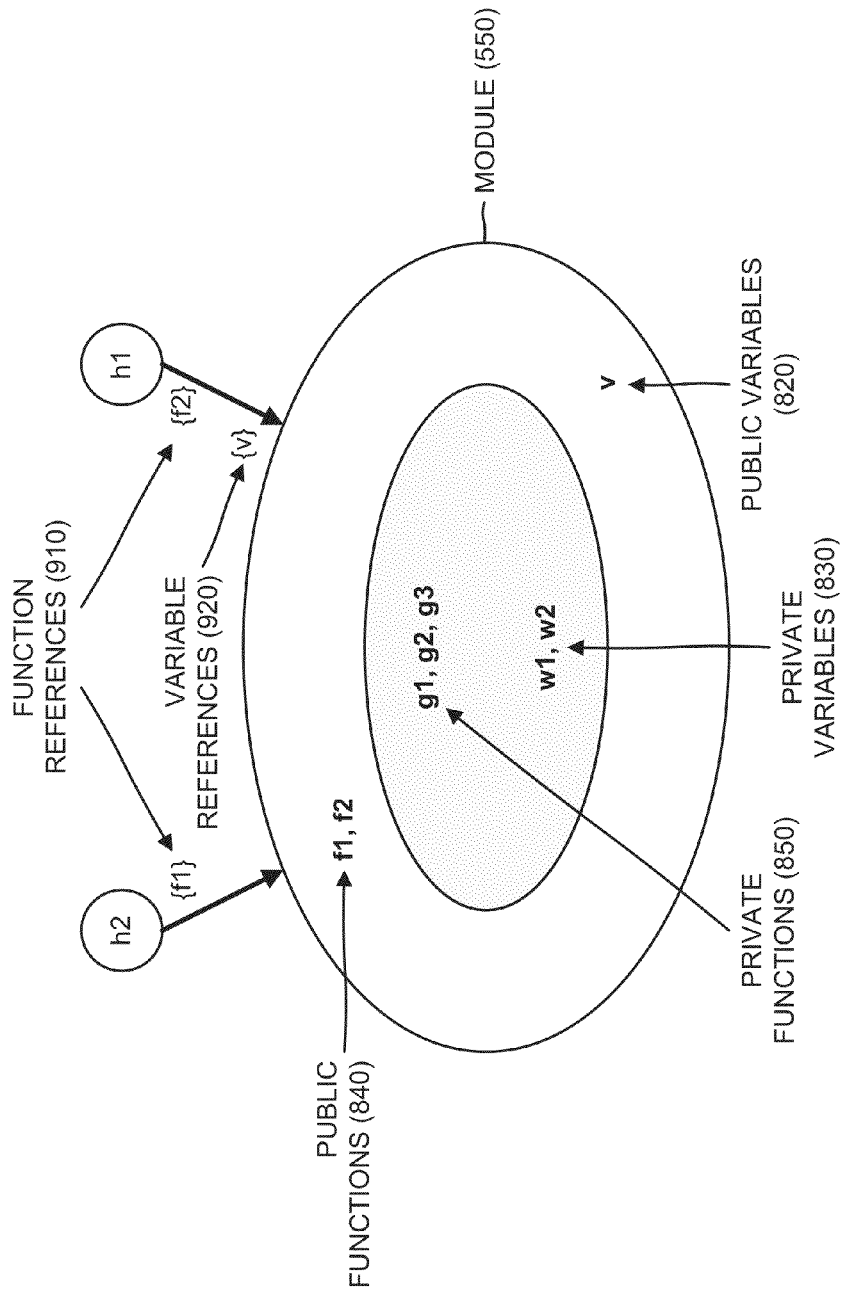
FIG. 9 is a diagram of another example representation of the source code after the automatic modularization by the software verification tool.

FIG. 9 is a diagram of another example representation 900 of source code 600 (FIG. 6) after source code 600 is automatically modularized by software verification tool 205. With reference to FIG. 9, automatic modularization component 510 may create a set of dependencies for module 550, where each dependency may include function references 910 (e.g., {f1} and {f2}) and variable references 920 (e.g., {v}).

Function references 910 may include one or more references to public functions 840 and/or private functions 850 provided in module 550. Variable references 920 may include one or more references to public variables 820 and/or private variables 830 provided in module 550. In one example, each function and variable may be assumed to belong to only one module 550, and it may be assumed that {functions/variables in output}={subset of inputs}−{unreachable from entry point}. In this example, function h3 (FIG. 7) may disappear from the output. If a file-of map is present in source code 600, then file-of (f1)=file-of(f2) and f1 and f2 may be in the same module 550. In this example, no cycles may be provided in an output. Thus, if public functions f1 and f2 (FIG. 7) are mutually recursive, public functions f1 and f2 may be in the same module. Alternatively, or additionally, private functions g2 and g3 (FIG. 7) may be in the same module.

Although FIG. 9 shows example information of representation 900, in other implementations, representation 900 may contain less information, different information, and/or additional information than depicted in FIG. 9.

Figure 10:
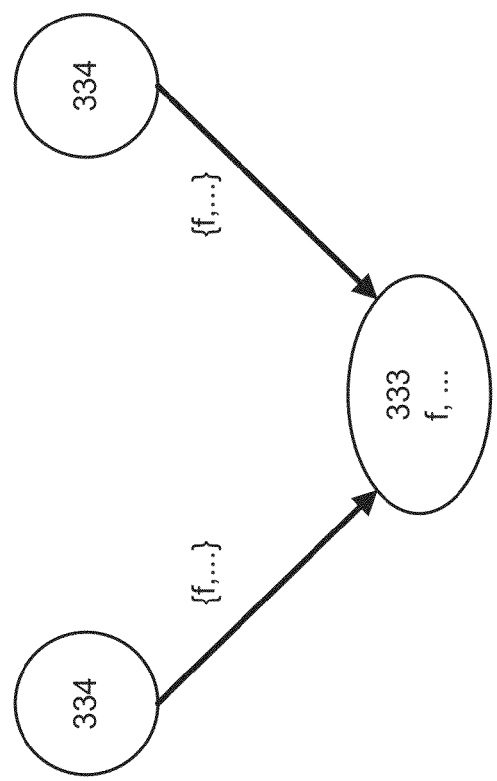
FIG. 10 is a diagram of still another example representation of the source code after the automatic modularization by the software verification tool.

FIG. 10 is a diagram of still another example representation 1000 of source code 600 (FIG. 6) after source code 600 is automatically modularized by software verification tool 205. With reference to FIG. 10, automatic modularization component 510 may ensure that a complexity of module 550 does not exceed a maximum value (e.g., 1,000). If the complexity of the functions and/or variables of module 550 exceeds the maximum value (e.g., 334+334+333=1,00)>1,000, as shown in FIG. 10), automatic modularization component 510 may perform further modularization of source code 600.

Although FIG. 10 shows example information of representation 1000, in other implementations, representation 1000 may contain less information, different information, and/or additional information than depicted in FIG. 10.

Example Process

FIGS. 11-14 are flow charts of an example process 1100 for automatically modularizing source code according to an implementation described herein. In one implementation, process 1100 may be performed by workstation 210 (e.g., via software verification tool 205). Alternatively, or additionally, process 1100 may be performed by another device or a group of devices (e.g., server 220) separate from or including workstation 210.

As shown in FIG. 1, process 1100 may include creating a graph based on source code (block 1110), and analyzing the source code to identify private and public variables and functions (block 1120). For example, in an implementation described above in connection with FIG. 5, automatic modularization component 510 may receive source code 520, and may create a graph based on source code 520, as indicated by reference number 530. In one example, automatic modularization component 510 may create a graph of representations (e.g., nodes) of variables and functions of source code 520 and representations (e.g., arcs connecting nodes) of dependencies between the variables and/or functions. Automatic modularization component 510 may analyze source code 520 in order to identify private and public variables (e.g., reads and writes) and private and public functions provided in source code 520.

Figure 11:
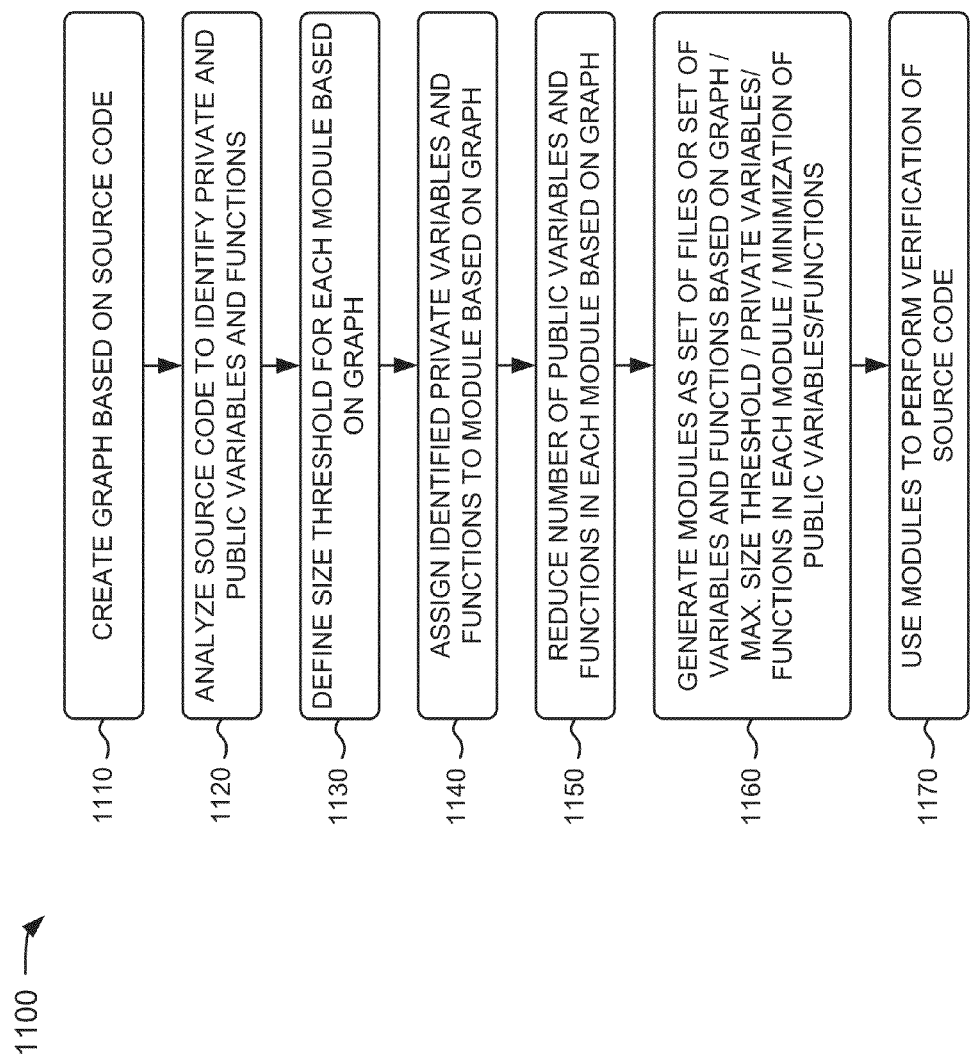

As further shown in FIG. 11, process 1100 may include defining a size threshold for each module based on the graph (block 1130), and assigning the identified private variables and functions to a corresponding module based on the graph (block 1140). For example, in an implementation described above in connection with FIG. 5, based on graph 530, automatic modularization component 510 may define a size threshold (e.g., a maximum size threshold) for each module 550 to be generated by automatic modularization component 510. In one example, the maximum size threshold may include a number of lines of source code 520, a number of functions (e.g., public and/or private) in module 550, a number of variables (e.g., public and/or private) in module 550, etc. Automatic modularization component 510 may provide the identified private variables/functions and/or public variables/functions (if any) in each module 550 based on graph 530, as indicated by reference number 540.

Returning to FIG. 11, process 1100 may include reducing a number of public variables and functions assigned to each module based on the graph (block 1150), and generating the modules as a set of files or a set of variables and functions based on the graph, the maximum size threshold, the private variables and functions, and the minimization of the public variables and functions (block 1160). For example, in an implementation described above in connection with FIG. 5, automatic modularization component 510 may reduce (e.g., minimize) the number of public variables and functions provided in each module 550 based on graph 530. In one example, public variables and/or functions may be used outside of each module 550, whereas private variables and/or functions may only be used inside each module 550. Automatic modularization component 510 may generate modules 550 as either a set of files or a set of variables and/or functions based on graph 530, the maximum size threshold, the private and/or public variables/functions in each module 550, the minimization of the number of public variables and functions provided in each module 550, and/or semantics-related characteristics of variables and functions provided in each module 550.

As further shown in FIG. 11, process 1100 may include using the modules to perform verification of the source code (block 1170). For example, in an implementation described above in connection with FIG. 5, automatic modularization component 510 may provide modules 550 to static verification analysis component 410, and static verification analysis component 410 may receive modules 550. Static verification analysis component 410 may perform a verification of modules 550, in serial (e.g., one at a time) or in parallel, and may generate results 560 based on the verification of modules 550.

Figure 12:
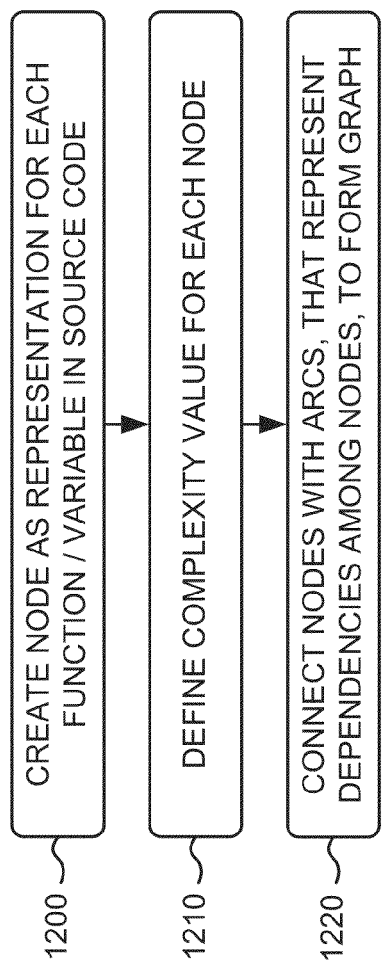

Process block 1110 may include the process blocks depicted in FIG. 12. As shown in FIG. 12, process block 1110 may include creating a node as a representation for each function and variable in the source code (block 1200), defining a complexity value for each node (block 1210), and connecting the nodes with arcs, that represent dependencies among the nodes, to form the graph (block 1220). For example, in an implementation described above in connection with FIG. 7, graph 700 may include representations (e.g., nodes) of variables 710 (e.g., w1, w2, and v) and representations (e.g., nodes) of functions 720 (e.g., f1, f2, g1, g2, and g3). Automatic modularization component 510 may give each variable and/or function, provided in a node, a value that may depend on a complexity or a physical size associated with the variable and/or function. Automatic modularization component 510 may provide arcs (e.g., arrows) between the nodes of graph 700. The arcs may represent dependencies between the variables and/or functions represented by the nodes.

Figure 13:
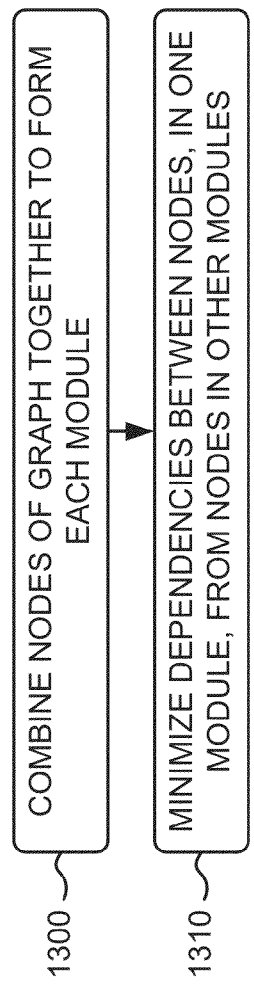

Process block 1160 may include the process blocks depicted in FIG. 13. As shown in FIG. 13, process block 1160 may include combining nodes of the graph together to form each module (block 1300), and minimizing dependencies between the nodes, in one module, from nodes in other modules (block 1310). For example, in an implementation described above in connection with FIG. 7, automatic modularization component 510 may combine two or more nodes of graph 700 together to create a module 550, and may minimize dependencies between nodes, in one module 550, from nodes in other modules 550.

Process block 1170 may include the process blocks depicted in FIG. 14. As shown in FIG. 14, process block 1170 may include verifying the modules, in serial, to perform verification of the source code (block 1400), and verifying the modules, in parallel, to perform verification of the source code (block 1410). For example, in an implementation described above in connection with FIG. 5, static verification analysis component 410 may perform a verification of modules 550, in serial (e.g., one at a time) or in parallel (e.g., more than one at a time), and may generate results 560 based on the verification of modules 550. Each module 550 may be accurately verified by software verification tool 205 because each module 550 may include very few public variables and/or functions, and may be aware of information contained in other modules 550.

CONCLUSION

Systems and/or methods described herein may provide a software verification tool that enables automatic modularization of software code (e.g., source code). The software verification tool may enable software code, such as large sized source code, to be split into one or more modules (e.g., portions of the software code). In one example, the modularization of the software code may or may not be visible by the user.

The foregoing description of implementations provides illustration and description, but is not intended to be exhaustive or to limit the implementations to the precise form disclosed. Modifications and variations are possible in light of the above descriptions or may be acquired from practice of the implementations.

For example, while series of blocks have been described with regard to FIGS. 11-14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
one or more processors to:
create a graph based on source code,
the graph:
including representations of variables and functions provided in the source code, and
indicating dependencies between the variables and the functions,
analyze the source code to identify private variables and functions of the source code and public variables and functions of the source code,
determine, based on the representations and the dependencies, a size threshold and semantics-related characteristics of functions and variables for each module of a plurality of modules,
each module including a portion of the source code,
assign, based on the representations and the dependencies, the private variables and functions to a corresponding module of the plurality of modules,
reduce, based on the representations and the dependencies, a number of the public variables and functions assigned to each module of the plurality of modules, and
generate the plurality of modules based on one or more of the graph, the size threshold, the assigned private variables and functions, and/or the number of the public variables and functions assigned to each module of the plurality of modules.

2. The device of claim 1, where the one or more processors are further to:
use the plurality of modules to perform verification of the source code.

3. The device of claim 2, where, when using the plurality of modules to perform the verification of the source code, the one or more processors are further to one of:
verify the plurality of modules, in series, to perform the verification of the source code, or
verify the plurality of modules, in parallel, to perform the verification of the source code.

4. The device of claim 2, where, when using the plurality of modules to perform the verification of the source code, the one or more processors are further to:
perform a static verification analysis on each of the plurality of modules.

5. The device of claim 2, where the one or more processors are further to:
output results of the verification of the source code.

6. The device of claim 1, where, when creating the graph, the one or more processors are further to:
create a node as a representation, of each variable and function in the source code, to obtain a plurality of nodes, and
connect the plurality of nodes with arcs, that represent dependencies among the plurality of nodes, to create the graph,
the dependencies among the plurality of nodes corresponding to the dependencies between the variables and the functions.

7. The device of claim 6, where, when generating the plurality of modules, the one or more processors are further to:
define a complexity value for each node, of the plurality of nodes, based on a complexity associated with a corresponding variable or function,
combine two or more nodes to form each module of the plurality of modules,
the two or more nodes being combined based on the complexity value for each node of the two or more nodes and a threshold complexity value, and
reduce dependencies between the two or more nodes, in a particular module of the plurality of modules, and the two or more nodes in remaining modules of the plurality of modules.

8. A method, comprising:
creating a graph based on source code,
the graph:
including representations of variables and functions provided in the source code, and
indicating dependencies between the variables and the functions,
the creating being performed by a device;
analyzing the source code to identify private variables and functions of the source code and public variables and functions of the source code,
the analyzing being performed by the device;
determining, based on the representations and the dependencies, a size threshold and semantics-related characteristics of functions and variables for each module of a plurality of modules,
each module including a portion of the source code,
the determining being performed by the device;
assigning, based on the representations and the dependencies, the private variables and functions to a corresponding module of the plurality of modules,
the assigning being performed by the device;
reducing, based on the representations and the dependencies, a number of the public variables and functions of each module of the plurality of modules,
the reducing being performed by the device; and
generating the plurality of modules based on one or more of the graph, the size threshold, the assigned private variables and functions, and/or the number of the public variables and functions of each module of the plurality of modules,
the generating being performed by the device.

9. The method of claim 8, further comprising:
using the plurality of modules to perform verification of the source code.

10. The method of claim 9, where using the plurality of modules to perform the verification of the source code further comprises one of:
verifying the plurality of modules, serially, to perform the verification of the source code; or
verifying the plurality of modules, in parallel, to perform the verification of the source code.

11. The method of claim 9, where using the plurality of modules to perform the verification of the source code further comprises:
performing a static verification analysis on each of the plurality of modules.

12. The method of claim 10, further comprising:
outputting results of the verification of the source code.

13. The method of claim 8, where creating the graph further comprises:
creating a node as a representation, of each variable and function of the variables and the functions in the source code, to obtain a plurality of nodes; and
connecting the plurality of nodes with arcs, that represent dependencies among the plurality of nodes, to create the graph,
the dependencies among the plurality of nodes corresponding to the dependencies between the variables and the functions.

14. The method of claim 13, where generating the plurality of modules further comprises:
defining a complexity value for each node, of the plurality of nodes, based on a complexity associated with a corresponding variable or function of the variables and the functions;
combining two or more nodes to form each module of the plurality of modules,
the two or more nodes being combined based on the complexity value for each node of the two or more nodes and a threshold complexity value; and
reducing dependencies between the two or more nodes, in a particular module of the plurality of modules, and the two or more nodes in remaining modules of the plurality of modules.

15. One or more non-transitory computer-readable media storing instructions, the instructions comprising:
one or more instructions that, when executed by a processor of a device, cause the processor to:
create a graph based on source code,
the graph:
including representations of variables and functions provided in the source code, and
indicating dependencies between the variables and the functions,
analyze the source code to identify private variables and functions of the source code and public variables and functions of the source code;
determine, based on the representations and the dependencies, a size threshold and semantics-related characteristics of functions and variables for each module of a plurality of modules,
each module including a portion of the source code;
assign, based on the representations and the dependencies, the private variables and functions to a corresponding module of the plurality of modules;
reduce, based on the representations and the dependencies, a number of the public variables and functions of each module of the plurality of modules, and
generate the plurality of modules based on one or more of the graph, the size threshold, the assigned private variables and functions, and/or the number of the public variables and functions of each module of the plurality of modules.

16. The non-transitory media of claim 15, the instructions further comprising:
one or more instructions that, when executed by the processor, cause the processor to:
use the plurality of modules to perform verification of the source code.

17. The non-transitory media of claim 16, where the one or more instructions to use the plurality of modules to perform the verification of the source code further comprise one or more instructions to one of:
verify the plurality of modules, serially, to perform the verification of the source code, or
verify the plurality of modules, in parallel, to perform the verification of the source code.

18. The non-transitory media of claim 16, where the one or more instructions to use the plurality of modules to perform the verification of the source code further comprise one or more instructions to:
perform a static verification analysis on each of the plurality of modules.

19. The non-transitory media of claim 16, the instructions further comprising:
one or more instructions that, when executed by the processor, cause the processor to:
output results of the verification of the source code.

20. The non-transitory media of claim 15, where the one or more instructions to create the graph further comprise one or more instructions to:

create a node as a representation, each variable and function in the source code, to obtain a plurality of nodes; and connect the plurality of nodes with arcs, that represent dependencies among the plurality of nodes, to create the graph, the dependencies among the plurality of nodes corresponding to the dependencies between the variables and the functions.

21. The non-transitory media of claim 20, where the one or more instructions to generate the plurality of modules further comprise one or more instructions to:

combine two or more nodes to form each module of the plurality of modules, and reduce dependencies between the two or more nodes, in a particular module of the plurality of modules, and the two or more nodes in remaining modules of the plurality of modules.

22. The non-transitory media of claim 15, the instructions further comprising:

one or more instructions that, when executed by the processor, cause the processor to:

perform incremental verification of the plurality of modules.

23. The non-transitory media of claim 15, the instructions further comprising:

one or more instructions that, when executed by the processor, cause the processor to one of:

determine errors in the source code based on an analysis of the plurality of modules; or determine an absence of the errors in the source code based on the analysis of the plurality of modules.

24. The non-transitory media of claim 15, the instructions further comprising:

one or more instructions that, when executed by the processor, cause the processor to one of:

provide the plurality of modules for display to a user; or prevent the display of the plurality of modules to the user.

* * * * *